C. WHIPPLE.

Screw-Blank Feeder.

No. 15,052.

Patented June 3, 1856.

UNITED STATES PATENT OFFICE.

CULLEN WHIPPLE, OF PROVIDENCE, RHODE ISLAND, ASSIGNOR TO NEW ENGLAND SCREW COMPANY, OF PROVIDENCE, RHODE ISLAND.

MAKING SCREWS.

Specification of Letters Patent No. 15,052, dated June 3, 1856.

*To all whom it may concern:*

Be it known that I, CULLEN WHIPPLE, of the city and county of Providence, in the State of Rhode Island, have invented certain new and useful Improvements in Machinery for Performing Certain Parts of the Operations Involved in the Manufacture of Wood-Screws, of which the following is a full, clear and exact description, reference being had to the accompanying drawing, which makes part of this specification, and in which—

Figure 1:
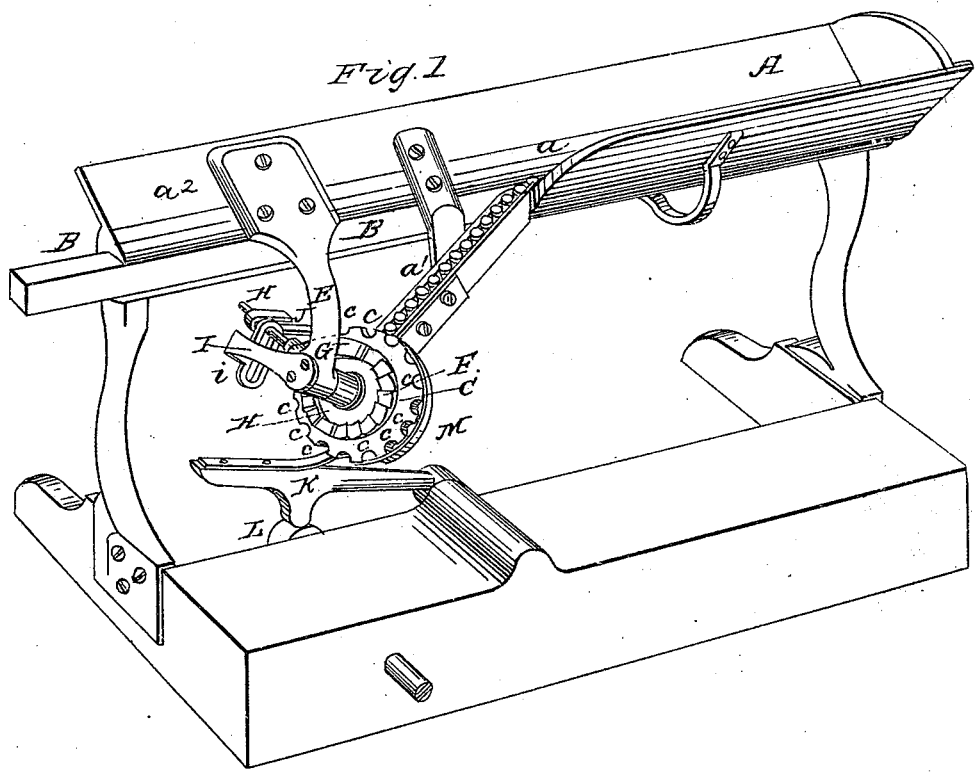
Figure 2:
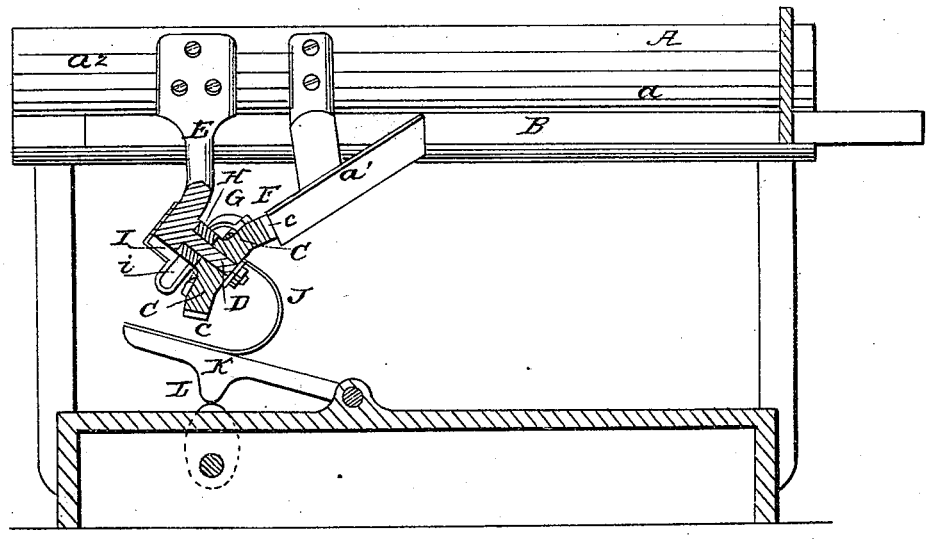

Figure 1 represents a view in perspective of certain parts of a machine for removing screw blanks from a heap lying in a hopper in promiscuous order, and arranging them with their heads all in one direction, and discharging them one at a time, and at regular intervals, into the feeding pincers, gripping jaws, or other parts provided for their reception in any of the machinery employed to perform any of the various operations of making a screw.

My invention and improvement relate to the feeder for screw machinery and consist of three elements, viz: 1st, a trough, slot, channel or other conduit to convey from a heap of screw blanks lying promiscuously in all positions, a moving row or series of such blanks with their heads all arranged in the same direction or thereabouts. 2nd, a series of grooves in a moving surface carried in succession past the mouth of the conduit in such manner that each groove will receive therefrom, as it passes, a blank and carry it off. 3rd, a guard, parallel or thereabouts, to the moving surface and placed against or near the same to prevent the blanks from leaving the grooves until they reach the point of discharge into the mechanism provided to receive them.

The accompanying drawing represents a portion of a frame adapted to machinery for shaving, nicking, or threading screws. This frame is surmounted by a hopper (A) resting on pedestals, to receive a quantity of screw blanks in promiscuous order ready to be arranged with their heads in the same direction.

At the bottom of the hopper a horizontal slot ($a$) is formed that terminates in a second slot ($a'$) which descends at an angle sufficient to permit screw blanks hanging in it by the head to slide freely through it by their own gravity, in a direction from its upper toward its lower end. The horizontal slot ($a$) should have one or both sides provided with a vibrating bar (B) or roller, or some other contrivance to move the blanks and cause them to advance slowly toward the inclined slot ($a'$).

At the lower end of the inclined slot, a frustum of a cone (C) is placed. It is mounted upon an inclined spindle (D) supported by a bracket (E) attached to a prolongation ($a^2$) of one side of the hopper (A). The axis of the frustum is immediately opposite the mouth or lower extremity of the inclined slot. The periphery of the frustum has a series of equi-distant grooves cut therein, converging toward the apex of the cone of which the frustum is a part. These grooves are of a width, measured on the periphery of the frustum and in the direction of its circumference, equal in width, to the mouth of the slot, and their depth is nearly but not quite equal to their width. On the base or larger end of the frustum, an annular series of equidistant ratchet teeth (F) are formed, which in number are equal to that of the grooves ($c$) in the periphery.

A ratchet hand (G) to act upon the ratchet teeth and move the frustum (C) is attached to a vibrating arm (H) hinged on the axle (D) at the inner end, and at the other end guided and supported in a slot ($i$) in an auxiliary bracket (I). The end of the arm (H) projects through the bracket (I) to connect with the end of a curved link rod (J) which communicates to it a reciprocating motion. This link rod is attached to a treadle (K) actuated by a cam (L) on a shaft below. The curved connecting rod is made of brass, steel, or other material that possesses the required elasticity, and should be of such a degree of stiffness that it will without much flexure press the ratchet hand (G) with sufficient force to turn the frustum, when the same moves freely; and yet at the same time, it should be so flexible as to yield sufficiently to allow the treadle to vibrate without moving the frustum, and thus prevent the machine from being broken in case the turning of the frustum should become obstructed. At each advance movement of the ratchet hand (G) one of the grooves ($c$) in the periphery of the frustum is brought opposite the mouth of the inclined slot ($a'$), and will receive a screw blank, which will be prevented from falling out of the groove after it is carried away from the mouth of the slot, by means of a guard-plate (M) which is arranged parallel to the periphery of the frustum and extends around the same far enough to bring the blanks to the desired point of delivery. This guard plate (M) may be supported in one side of the slot, or by any part of the frame to which it may be convenient to attach it.

If instead of a frustum of a cone, a cylinder were used, the heads of the blanks, because of their larger diameter, would have a constant tendency to roll forward faster than the points, because of the head of the blank working partially into the space between the guard plate (M) and the moving surface. The conical form of the carrying or moving surface conteracts this tendency of one end of the blank to advance faster than the other, by making the circle in which the head travels around the base of the frustum longer than that which the shank has to travel around its apex in the same proportion as that part of the surface of the head which rolls on the guard-plate is larger in diameter than the part of the surface of the shank which rolls on the guard plate. By this means the blank has a tendency to maintain a position parallel to one of the planes radiating from the axis of the cone. This grooved frustum resembles a beveled cog wheel, and may be constructed in the same manner.

What I claim as my invention and desire to secure by Letters Patent, is—

The combination of the feeding slot, (a a') moving series of discharging grooves, (c), and guard plate (M); but I make no claim to either of these elements of the combination by itself.

In testimony whereof, I have hereunto subscribed my name.

CULLEN WHIPPLE.

In presence of—
F. G. FONTAINE,
A. E. H. JOHNSON.